US011970014B2

(12) United States Patent
Van Vliembergen

(10) Patent No.: US 11,970,014 B2

(45) Date of Patent: Apr. 30, 2024

(54) METHOD FOR PROFILING A PRINT MEDIUM FOR USE IN A PRINTING SYSTEM

(71) Applicant: Canon Production Printing Holding B.V., Venlo (NL)

(72) Inventor: Eduardus J. W. Van Vliembergen, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 439 days.

(21) Appl. No.: 17/367,012

(22) Filed: Jul. 2, 2021

(65) Prior Publication Data

US 2021/0331503 A1 Oct. 28, 2021

Related U.S. Application Data

(63) Continuation of application No. PCT/EP2020/050822, filed on Jan. 14, 2020.

(30) Foreign Application Priority Data

Jan. 16, 2019 (EP) .................................... 19152103

(51) Int. Cl.
*B41J 29/393* (2006.01)
*G03G 15/00* (2006.01)

(52) U.S. Cl.
CPC ............ *B41J 29/393* (2013.01); *G03G 15/50* (2013.01)

(58) Field of Classification Search
CPC ....... B41J 2/2107; B41J 29/393; G03G 15/50; G03G 15/6538
See application file for complete search history.

(56) References Cited

U.S. PATENT DOCUMENTS 6,134,020 A * 10/2000 Masumoto ............. B41J 2/2107 358/1.14
6,351,320 B1 2/2002 Shin
(Continued)

FOREIGN PATENT DOCUMENTS

EP 3 162 579 A1 5/2017

OTHER PUBLICATIONS

European Search Report, issued in EP Application No. 19 15 2103, dated Jul. 4, 2019.

(Continued)

*Primary Examiner* — Lam S Nguyen

(74) *Attorney, Agent, or Firm* — Birch, Stewart, Kolasch & Birch, LLP

(57) ABSTRACT

The invention relates to a method for profiling a print medium for use in a printing system. The print medium is received in an input holder and a plurality of test jobs is received in a test job receiver. For each test job a uniquely determined combination of at least a first printing system parameter of print speed of the printing system and a second printing system parameter of coverage of the marking material is intended to be prepared by a print controller. The printing system registers a test result of each test job. The print controller creates a two-dimensional media print mode table of media print modes for the print medium to be profiled based on the test results of the test jobs for the print medium. When a print job arrives intended to be printed on the profiled medium, a media print mode is selected from the two-dimensional media print mode table.

11 Claims, 6 Drawing Sheets

(56) References Cited

U.S. PATENT DOCUMENTS

| | | | | |
|---|---|---|---|---|
| 7,050,196 | B1 | 5/2006 | Piatt et al. | |
| 9,925,810 | B2 * | 3/2018 | Kalloe | G03G 15/6538 |
| 2007/0182783 | A1 * | 8/2007 | Hoshiyama | B41J 2/04551<br>347/7 |
| 2008/0094645 | A1 * | 4/2008 | Sato | H04N 1/00697<br>358/1.1 |
| 2018/0281487 | A1 | 10/2018 | Hauck et al. | |

OTHER PUBLICATIONS

International Search Report for PCT/EP2020/050822 dated Mar. 3, 2020.

Written Opinion of the International Searching Authority for PCT/EP2020/050822 dated Mar. 3, 2020.

* cited by examiner

300

| Ink Coverage (%) \ Print speed (ppm) | 60 | 120 | 180 | 240 | 300 | 360 |
|---|---|---|---|---|---|---|
| 0 | | | | | | |
| 10 | | | | | | |
| 20 | | | | | | |
| 40 | | | | | | |
| 60 | | | | | | |
| 80 | | | | | | |
| 90 | | | | | | |
| 100 | | | | | | |

FIG. 3

METHOD FOR PROFILING A PRINT MEDIUM FOR USE IN A PRINTING SYSTEM

CROSS REFERENCE TO RELATED APPLICATIONS

This application is a Continuation of PCT International Application No. PCT/EP2020/050822, filed on Jan. 14, 2020, which claims priority under 35 U.S.C. 119(a) to patent application Ser. No. 19/152,103.8, filed in Europe on Jan. 16, 2019, all of which are hereby expressly incorporated by reference into the present application.

FIELD OF THE INVENTION

The present invention relates to a method for profiling a print medium for use in a printing system, the printing system configured to print on profiled print media and comprising a print controller for controlling printing system parameters to be applied when printing on the print medium, a print engine for printing marking material on the print medium, an input holder for receiving the print medium in the printing system, an output holder for receiving the print medium when printed by the print engine, a test job receiver for digitally or analogue receiving a plurality of test jobs submitted to the printing system, and a paper path comprising a duplex loop for sending the print medium twice along the print engine, the method comprising the step of receiving the print medium in the input holder.

A print medium is defined to be a material for receiving marking material deposited by the printing system. The print medium may be paper, plastic, wood, textile, glass, etc.

When an end user runs into problems during printing on a print medium, a cause may be that wrong printing system settings are used. In order to make optimal prints on the print medium, print media profiles are created. A print media profile is a set of printing system parameters that define the settings on the printing system for a specific print media/printer/RIP combination. By providing customers with a profile for the media to be used, a trial-and-error process for the customer is eliminated and it is confidently known that the print media works with the printing system. Depending on the customer other media profiles may be used, sometime optimized on quality, sometimes on productivity or cost.

BACKGROUND OF THE INVENTION

To run a certain print medium on a printing system, the printing system needs to use prescribed printing system parameters to print on this print medium. For a cut sheet inkjet printer, important values are a total area coverage (TAC), i.e. an amount of marking material that can be placed on the print medium, an amount of primer ink, a temperature of a print surface, a distance from the print head to the print medium, a print speed along the paper path and a colour profile to be applied. A TAC that is too high for the print medium may result in marking material deposition inside the print engine as pollution or smearing and when printed for a longer time will result in damage to the print engine. Other printing system parameters influence the print quality and the amount of sheets that are rejected by the printing system due to deformation of the sheets.

In U.S. Pat. No. 7,050,196 B1 a method for a printing system is revealed to print a test sheet to visually determine a maximum ink coverage on the print medium. However, a printing speed of the printing system is fixed and by looking afterwards at the printed test page the printing system has already been polluted.

In patent EP3162579 a method for approving a new print medium for use in a printing system is revealed, wherein such a large number of prints of a test job is printed that a stack of the number of prints is sufficiently high to establish an unwanted deposit of marking material on the side of a stack.

As determining values for printing system parameters that result in optimal print quality and runnability currently requires printing significant amount of print media, time, and specialized hardware, a user of the printing system can currently choose print media that have been pre-tested by a supplier of the print media and from which media definitions have been made available.

An object of the present invention is to provide a method for users that want to use their own print medium and do not want to wait for the supplier to test the print medium. Another object is to provide a method to find ranges of printing system parameters that are adequate for a customer's usage and will not result in damage to the print engine. Another object is to provide a method to find ranges of printing system parameters that are adequate for a specific printer taking into account variations between different printers. Another object of the present invention is a printing system in which the method is implemented.

SUMMARY OF THE INVENTION

For this purpose, a method according to the invention comprises the steps of digitally receiving the plurality of test jobs in the test job receiver, wherein for each test job of the plurality a uniquely determined combination of at least a first printing system parameter of print speed of the printing system and a second printing system parameter of coverage of the marking material is intended to be prepared by the print controller, for each test job, processing the test job according to the uniquely determined combination using the print medium to be profiled, the printing system registering a test result of the test job, and the print controller creating a two-dimensional media print mode table of media print modes for the print medium to be profiled based on the test results of the plurality of test jobs for the print medium, the two-dimensional media print mode table to be selected from when printing on the print medium, wherein each media print mode is uniquely determined by a uniquely determined combination prepared by the print controller and comprises an indication item of the test result corresponding to the uniquely determined combination.

The printing system registers the test results of the test jobs without any user judgement. By using the printing system itself as a measurement tool, a complete set of media print modes are created and also limitations of some of the media print modes may be indicated. This is advantageous since the media print modes are tested on the printing system which is going to be used for producing documents by the operator or customer. Also the resulting print media modes are automatically tuned to the climate conditions of the location of the printing system. By automatically creating a whole series of media print modes the user is able to select a media print mode that fits best with his printing applications. Even media print modes that may not be used for all applications may be offered and limitations are communicated via the user interface of the printing system. These limitations may not apply for specific applications of the customer. It is easy to repeat the method for profiling the print medium in case a next batch of media turns out to have different printing properties. A colour profile may be part of the media print mode.

The media print mode table is part of the print medium profile. The term media print mode may hereinafter be abbreviated as "MPM".

According to an embodiment the method comprises the step of limiting the two-dimensional media print mode table to media print modes which have conditional or good test results. A conditional test result is meant to be a test result that is good under specific conditions. The specific conditions may be restrictions to the number of sheets of the print medium to be printed upon, the sheet content being text, drawings of photographical images, etc.

According to an embodiment each test job of the plurality of test jobs is further determined by at least one of a first specification criterion whether or not the test job comprises an image to be printed, a second specification criterion whether or not the test job makes use of the duplex loop, a third specification criterion which at least one kind of marking material is used, and a fourth specification criterion of a print head height in case of the print engine comprising a print head.

According to a further embodiment the at least one kind of marking material is a coloured ink, a varnish ink, a primer ink and/or a coloured toner.

According to an embodiment the method comprises the step of selecting from the two-dimensional media print mode table based on the test results at least one of a default media print mode, a high gamut media print mode, and a high speed media print mode.

According to an embodiment the method comprises the step of method comprises the step of determining from the test results at least one key performance indicator value with respect to each of an image quality, printer productivity and/or print cost, and automatically selecting at least one out of the default media print mode, the high gamut media print mode and the high speed media print mode based on the at least one key performance indicator value. During the creation of the two-dimensional media print mode table, for each media print mode relevant key performance indicator values are determined such as a general quality, productivity and cost. The printing system itself measures for example the general quality based on colour gamut, micro uniformity, print artefacts, deformation, cockling, smearing, carboning and end deformation, productivity based on print speed, and cost inclusive waste. Via the user interface of the printing system the user may indicate an importance of each sub key performance indicator mentioned here-above by means of weight factors.

The user interface may be configured to show the key performance indicators per media print mode which enables the user to make a choice based on aspects that matter to him instead of on technical settings.

According to an embodiment the media print modes in the two dimensional table are enabled to be filtered on selected key performance indicator value ranges. By doing so, it is avoided that the user has to check the key performance indicator values of each individual media print mode. Media print modes that fit with the selected ranges may be coloured in a specific colour, for example green.

By decreasing or in some cases increasing the ranges an area of media print modes coloured with the specific colour may change.

The user can check the values of the remaining media print modes or adapt the ranges even more until only one media print mode remains green.

In order to define the default media print mode the print controller of the printing system makes use of the filter mechanism to be applied to the key performance indicators are mentioned here-above. The print controller may start by selecting rather large ranges for quality, productivity and cost. Probably almost all media print modes fit within the selected ranges. By making the ranges gradually smaller, less media print modes will fit within the ranges. This process continues until one media print mode is left over. This one media print mode becomes the default media print mode. The default media print mode considers all key performance indicators as being important and tries to find a balance.

In order to define a high gamut media print mode, print quality—and especially colour gamut—is considered to be more important than productivity.

In order to define a high speed media print mode, productivity—and especially print speed—is considered to be more important than print quality.

In order to determine a default media print mode, a high gamut media print mode and high speed media print mode, the use of filters on key performance indicator values is not essential, but preferable since it is an easy way to implement the method according to the invention. The selection of the mentioned media print modes may also be implemented by comparing the parameter values of all tested media print modes.

According to an embodiment for each test job the step of registering the test result of the test job comprises the sub-steps of sensing, during processing of the test job, the print medium being transported from the input holder by means of the paper path to the output holder along the print engine and a plurality of sensors resulting in a plurality of measured sensor values, and determining the test result of the test job based on the measured sensor values to be good, bad or conditional. In the broadest definition, a sensor is a device, module, or subsystem whose purpose is to detect events or changes in its environment and send the information to other electronics, frequently the print controller of the printing system.

According to an embodiment at least one test job is a digital image and the test job receiver is digital.

According to an embodiment at least one test job is a hardcopy original and the test job receiver is analogue.

The present invention also relates to a printing system configured to profile print media and comprising a print controller for controlling printing system parameters to be applied when printing on the print medium, a print engine for printing marking material on the print medium, an input section for receiving the print medium in the printing system, a paper path from input holder to output holder comprising a duplex loop, an output section for receiving the print medium when printed, a receiving section for receiving test jobs submitted to the printing system, and a plurality of sensors along the paper path wherein the print controller is configured to execute a method according to the invention.

The present invention also relates to a non-transitory recording medium comprising computer executable program code configured to instruct a computer to perform a method according to the invention.

BRIEF DESCRIPTION OF THE DRAWINGS

The invention will now be explained further with reference to the Examples indicated below.

FIG. 3 shows a two-dimensional media print mode table according to the present invention.

DETAILED DESCRIPTION OF EMBODIMENTS

Figure 1:
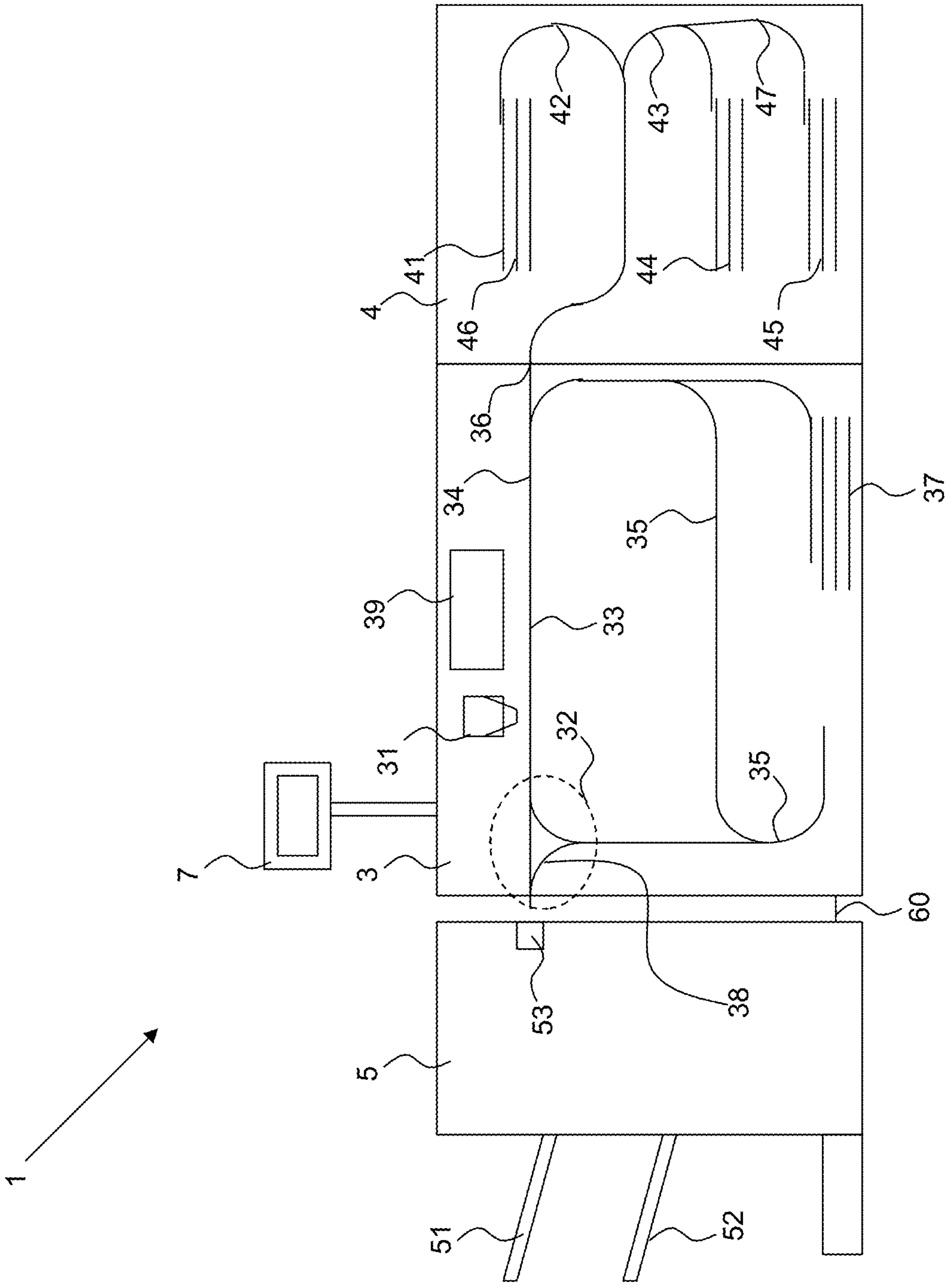
FIG. 1 shows the general arrangement of the printing system according to the present invention.

The present invention will now be described with reference to the accompanying drawings, wherein the same or similar elements are identified with the same reference numerals throughout the several views.

The embodiments are explained by taking in the examples a printing system comprising a print head or print assembly, like an inkjet printing system or an electro-photographical printing system. In principal a printing system in which any kind of print medium, any kind of marking material, and, if needed, any kind of finishing material is to be loaded and the kind of marking material is to be printed on the kind of print medium may be configured to use the methods according to the embodiments of the present invention.

FIG. 1 shows schematically an exemplary printing system 1 in which the method according to the invention is applicable. The printing system 1 comprises an output section 5, a print engine and control section 3 possibly containing one or more additional input holders 37, a local user interface 7 and an input section 4. The output section 5, the print engine and control section 3 and the input section 4 may comprise sensors to sense the circumstances of the sheets when transported along a paper path from the input section 4 to the output section 5 which paper path will be elucidated hereinafter. The sensors are calibrated beforehand in order to assure that all measurement sensors involved in the method according to the present invention are calibrated and correctly operating, and to take sensor aging, pollution, environmental conditions like humidity and temperature into account when reading the sensor measurements.

The output section 5 comprises two supply material output holders 51, 52 for holding printed print medium. The printed print medium is transported from the print engine and control section 3 via an inlet 53 to the output section 5. The output section 5 is digitally connected by means of a cable 60 to the print engine and control section 3 for bi-directional data signal transfer. Other supply material output holders may be envisioned, for example a supply material output holder for residuals of ink or toner or a supply material output holder for waste paper in case of drilling actions, cutting actions or perforating actions. Depletions of such a supply material output holder may be scheduled according to the method of the invention.

The print engine and control section 3 comprises a print engine and a print controller 39 for controlling the printing process. The print controller 39 is a computer or server or a workstation, connected to the print engine and connected to the digital environment of the printing system, for example a network for transmitting a submitted print job to the printing system. The print controller 39 also comprises in storage a media catalogue software system (not shown) for print media which are profiled for use by the printing system 1 according to the method of the present invention. The print controller 39 also comprises a receiving section (not shown) for receiving print jobs submitted to the printing system 1.

The print engine comprises a print head or print assembly 31 for ejecting or fixing marking material to the print medium and a paper path 34, 32, 35 for transporting the print medium from an entry point 36 of the print engine and control section 3 to the inlet 53 of the output section 5. Along the paper path 34, 32, 35 sensors may be applied. The print head or print assembly 31 is positioned near the paper path section 34. While a print medium is transported along the paper path section 34, the print medium receives the marking material from the print head or print assembly 31. A next paper path section 32 is a flip unit for selecting a different subsequent paper path for simplex or duplex printing of the print medium. The flip unit 32 may be also used to flip a printed sheet of print medium after printing in simplex mode before the printed sheet leaves the print engine and control section 3 via a curved section 38 of the flip unit 32 and via the inlet 53 to the output section 5. In another embodiment of the printing system the curved section 38 of the flip unit 32 is not present and the turning of a simplex page has to be done via another paper path section 35 and leads to productivity loss. In another embodiment of the printing system an additional turning station—partly to replace the curved section 38 of the flip unit 32—is configured outside the print engine and control section 3 between the print engine and control section 3 and the output section 5.

When the print medium has to be printed in a simplex mode, the print medium may directly by transported via the flip unit 32 to the inlet 53 of the output section 5. When the print medium has to be printed in a duplex mode, the print medium is transported via the flip unit 32 to the other paper path section 35 for turning the print medium in order to switch front side and back side of the sheets. The sheets are then transported to the paper path section 34 again for printing on the rear side of the sheets by means of the print head or print assembly 31.

The print engine and control section 3 also comprises an additional input holder 37 for holding print medium. Print medium may have to be input in the additional input holder 37 in another orientation than an input orientation for the print medium holders 44, 45, 46.

The input section 4 comprises a plurality of print medium input holders 44, 45, 46 for holding the print medium before transporting the sheets of the print medium to the print engine and control section 3. Sheets of the print medium are guided from the print medium input holders 44, 45, 46 by guiding means 42, 43, 47 to an outlet 36 for entrance in the print engine and control section 3. Sheets of the print medium are now guided from the print medium input holders 44, 45, 46 to the right side of the print medium input holders 44, 45, 46, but other configurations of the print medium holders may be envisioned for at least partly guiding the sheets to the left side. For these other configurations a suitable instruction for face up or face down loading of the print medium in the respective print medium input holder will be generated by the printer controller.

FIG. 1 shows a plurality of print medium input holders. The invention, however, also applies to a printing system comprising only one print medium input holder.

FIG. 1 shows a plurality of print medium output holders. The invention, however, also applies to a printing system comprising only one print medium output holder.

Figure 2:
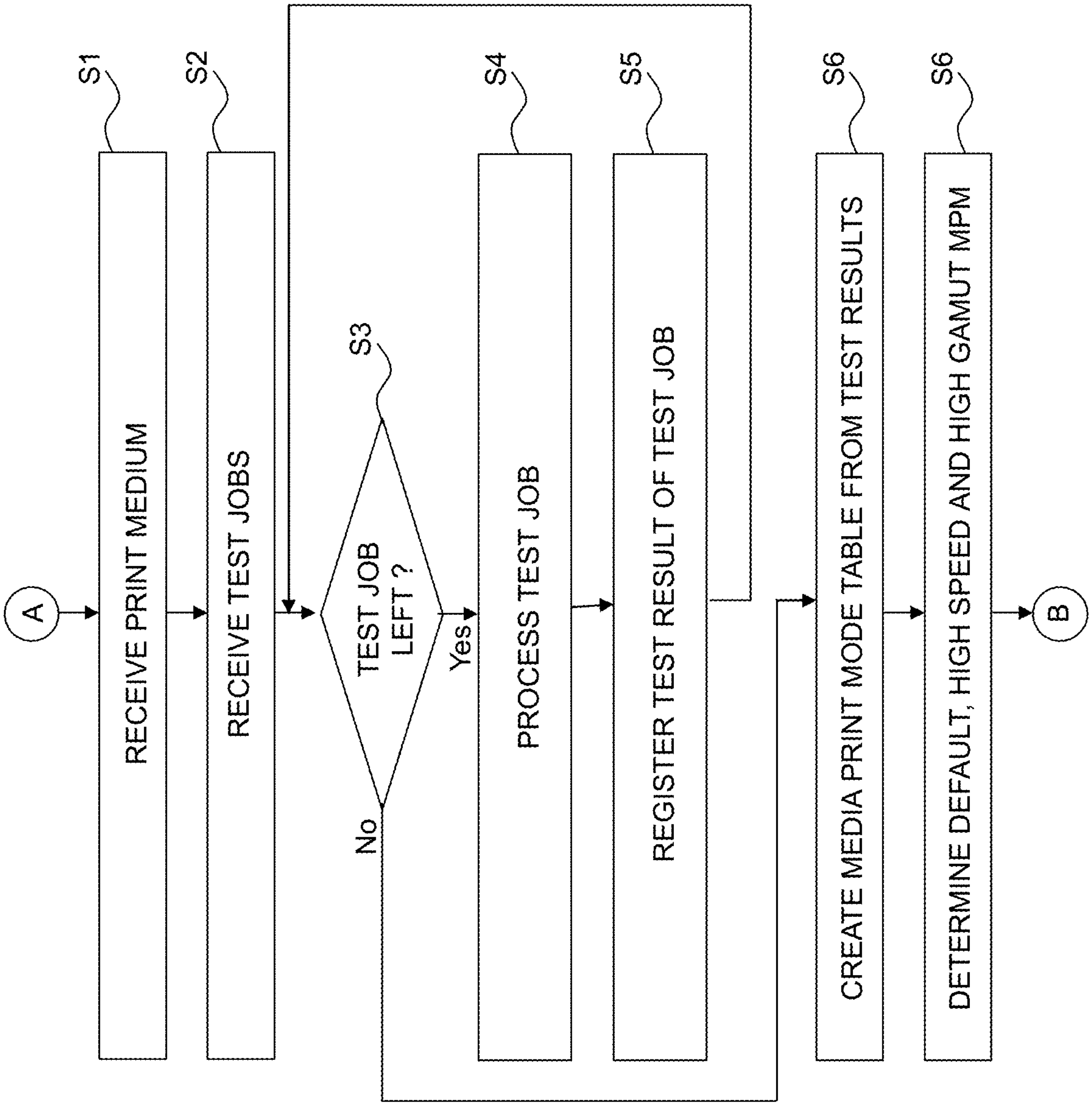
FIG. 2 shows a flow diagram of an embodiment of the method according to the present invention.

FIG. 2 shows a flow diagram of the method according to the present invention. The method starts in a starting point A and leads to a first step S1.

In the first step S1 the print medium to be profiled is received in at least one of the input holders 41, 44, 45, 37 of the printing system 1.

In a second step S2 a plurality of test jobs is digitally received in the test job receiver of the print controller 39. For each test job of the plurality a uniquely determined combination of at least a first printing system parameter of print speed of the printing system and a second printing system parameter of coverage of the marking material is intended to be prepared by the print controller 39. The test job may for example comprise empty pages with no images or text to be printed, pages to be printed single-sided in a simplex mode and pages to be printed double-sided in a duplex mode making use of the duplex loop of the printing system 1. A content of a test page may be text, an image or images, or a combination of both text and image(s). The test page may contain mono-colour images/text like black and white, and/or multi-coloured images/text. The test job may also comprise empty pages on which nothing or only a primer ink or a varnish ink is deposited by the print engine 31 of the printing system 1.

In a third step S3 the test jobs are iterated upon.

In a fourth step S4 the appropriate test job is processed according to the uniquely determined combination of print speed and ink coverage using the print medium to be profiled. FIG. 3 shows a table 300 of combinations of print speed and ink coverage. The print speed for the printing system 1 is selected from 60 prints per minute (ppm), 120 ppm, 180 ppm, 240 ppm, etc. The ink coverage is selected from 0%, 10%, 20%, 40%, etc., until 100%. A percentage (%) of ink coverage is an area of the sheet covered by ink divided by a total area of the sheet multiplied by 100. A first percentage value of 0% means that no marking material is deposited on the print medium, i.e. the print medium is just transported along the paper path—whether or not via the duplex loop—without receiving any marking material from the print engine of the printing system.

If it is sensed by the sensors that problems occur for a media print mode with a specific ink coverage, media print modes with a higher ink coverage may not need to be tested anymore and may be removed from the table 300.

If it is sensed by the sensors that problems occur for a media print mode with a specific print speed, media print modes with a higher print speed may not need to be tested anymore and may be removed from the table 300.

Each cell in the table 300 represents a media print mode according to the invention. For each cell in the table 300 optimal settings such as Total TAC, Mono TAC, Color Grip, print head height, etc. are determined for different kind of applications. As soon as the amount of ink coverage at a specific speed results in damage to the engine (for example by pollution) the settings will not be determined anymore. Therefore the cells in the table 300 for which the optimal settings could not be determined, are removed from the table 300. The removed cells are for example marked with a cross symbol 410 as shown in an actual table 400 in FIG. 4.

From the test jobs it may result that a cell can only be used with specific limitations. For example, the cell may only be used for files that have at least some pages with a low ink coverage, or the cell may only be used for run lengths up to 100, or the cell may only be used if the operator is willing to do some additional maintenance actions like cleaning. Such a limitation is stored in the cell. The fact that a cell comprises at least one limitation is expressed in the actual table 400 in FIG. 4 by an exclamation mark 420 in the cell.

Cells without limitations and being suitable for printing on the print medium are coloured by a predetermined colour, for example green.

Figure 5:
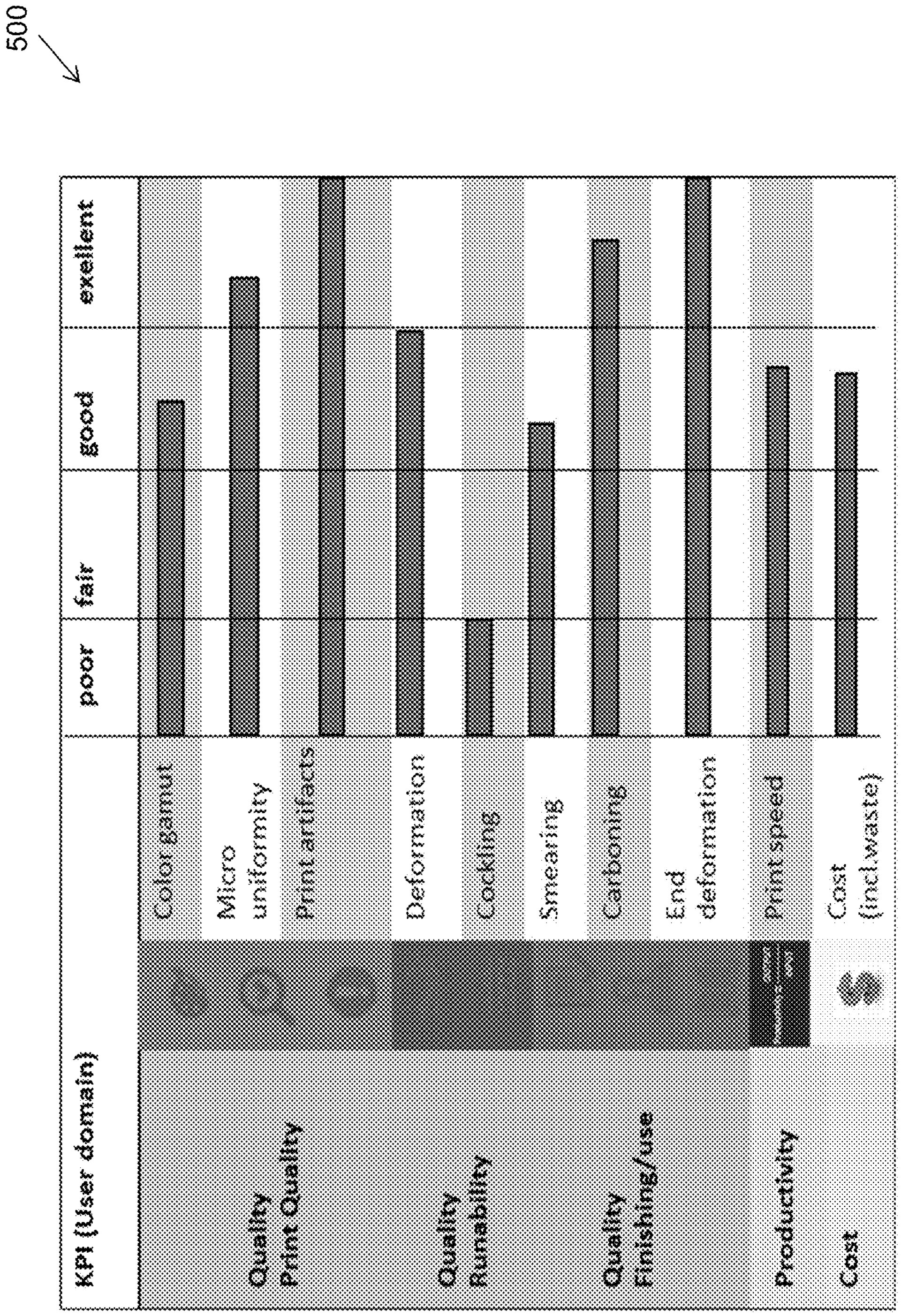
FIG. 5 shows the key performance indicators for one media print mode.

In a fifth step S5 the printing system is registering a test result of the test job. The test result is derived from all sensor values registered by the sensors in the paper path 34, 32, 35 of the printing system 1 which are measured during the processing of the test job. The test result may be expressed in a number of key performance indicators. FIG. 5 shows in a key performance indicator table 500 a number of key performance indicators like Quality, Productivity ("Print Speed") and Cost including Waste. The key performance indicator Quality may be further divided into sub key performance indicators like Print Quality, Runability and Quality of Finishing or Use. The Print Quality may be further sub-divided into Colour Gamut, Micro Uniformity and Print Artefacts. The Runability may be further sub-divided into Deformation and Cockling. The Quality of Finishing or Use may be further sub-divided into Smearing, Carboning and End Deformation. For each media print mode the values for the key performance indicators are determined. Determination may on different aggregation levels as mentioned here-above. The values of the key performance indicators are shown by horizontal bars at the right side of the table 500.

According to an embodiment the user interface 7 of the printing system 1 provides the values of the key performance indicators for each media print mode which is tested. This is advantageous, because the user is able to make a choice based on terms that matter to him instead of on technical settings.

Now the method returns to the third step S3 to process a next test job. If all test jobs have been processed, the method continues to a sixth step S6.

In a sixth step S6 the print controller 39 creates a two-dimensional media print mode table of media print modes for the print medium to be profiled based on the test results of the plurality of test jobs for the print medium. From the two-dimensional media print mode table 400 a media print mode is going to be selected when printing on the print medium in the future.

In a seventh step S7 the print controller 39 determines a default media print mode, a high speed media print mode and a high gamut media print mode according to the present invention. The determination of a default media print mode, a high speed media print mode and a high gamut media print mode is elucidated hereinafter.

The method ends in end point B.

Figure 4:
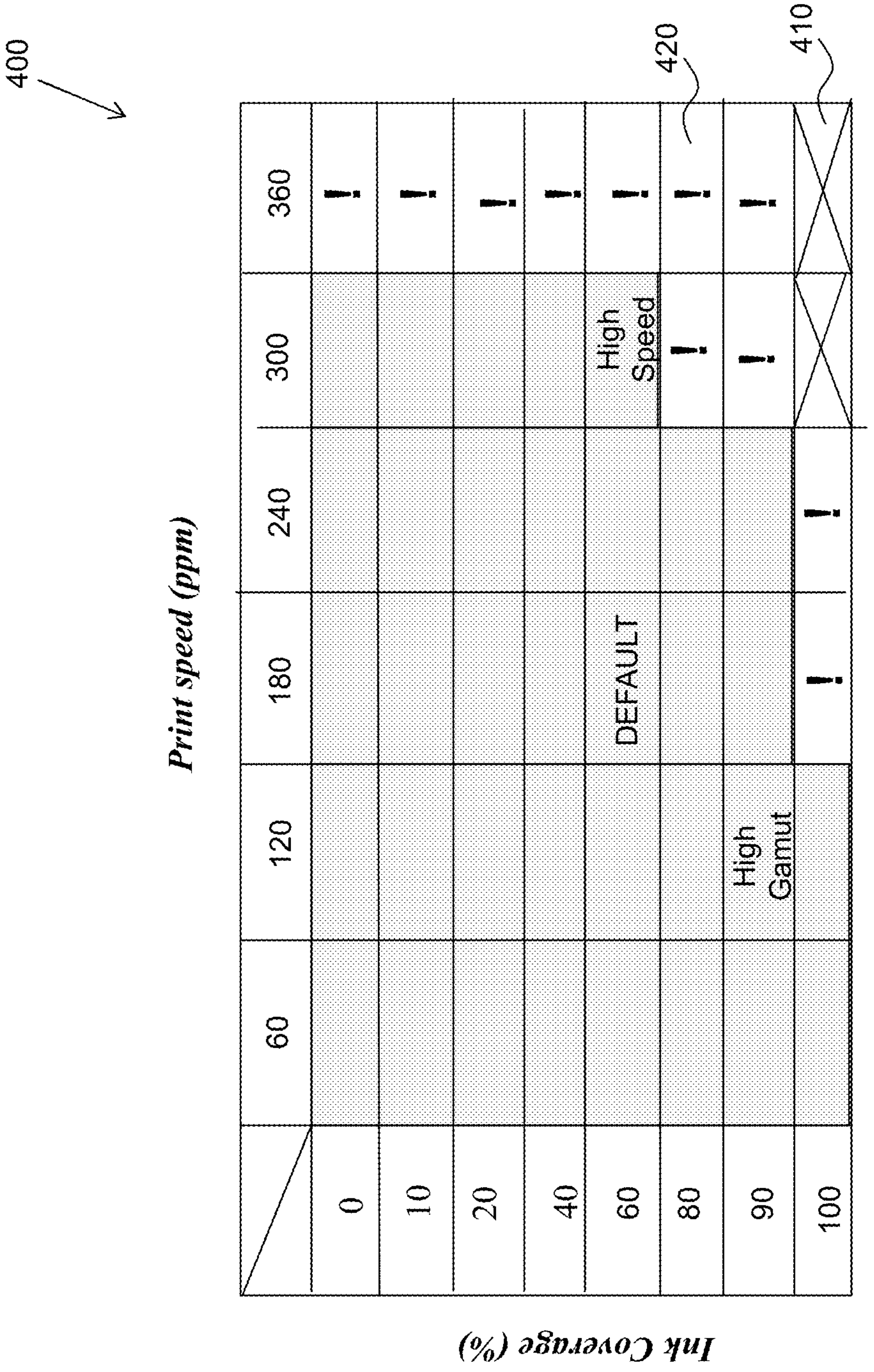
FIG. 4 shows the two-dimensional media print mode table of FIG. 3 provided with indications of the test results.

In FIG. 4 one cell is labelled as default media print mode. Once the media print mode table is created and filled with media print modes for the print medium, for each of the media print modes the key performance indicators are determined according to the invention. Once the key performance indicators are determined the default media print mode is automatically determined by the print controller 39. The print controller 39 makes use of a filter mechanism which is enabled by the key performance indicators. The filtering process starts with selecting rather large ranges for quality, productivity and cost. Probably all media print modes fit within these ranges. In a next step the ranges are gradually made smaller, so that less media print modes fit within the ranges. This step is repeated until only one media print mode is left. The one left media print mode becomes the default media print mode. By doing so, the default media takes into account all key performance indicators as being important and a balance between the key performance indicators is found. Therefore the cell representing the default media print mode is preferably situated in a central environment of the media print mode table 400.

The determination of the default media print mode is done at the printing system of the customer in the customer's environment which makes that the determination automatically takes into account small differences between printers and temperatures, humidity, etc. at the customer's location. The default media print mode in FIG. 4 is the media print mode with an ink coverage of 60% and a print speed of 180 ppm.

In FIG. 4 one cell is labelled as High Speed media print mode. If the key performance indicator Productivity is considered to be more important than the key performance indicator Print Quality, the High Speed media print mode is preferable to be selected by the user. The High Speed media print mode in FIG. 4 is the media print mode with an ink coverage of 60% and a print speed of 300 ppm.

In FIG. 4 one cell is labelled as High Gamut media print mode. If the key performance indicator Print Quality is considered to be more important than the key performance indicator Productivity, the High Gamut media print mode is preferable to be selected by the user. The High Gamut media print mode in FIG. 4 is the media print mode with an ink coverage of 90% and a print speed of 120 ppm.

According to an embodiment the user interface 7 of the printing system 1 is configured to facilitate the user in selecting of the default media print mode, the High Gamut media print mode or the High Speed media print mode, or any of the other media print modes in the actual media print mode table 400. When a media print mode with limitations is selected by the user—a cell with an exclamation mark 420 in the actual media print mode table 400—the user interface 7 of the printing system 1 is configured to show descriptions of the limitations corresponding to the cell for example by means of a pop up window and a confirmation button that has to be pressed by the user in order to confirm that the media print mode represented by the cell is desired.

The two-dimensional media print mode table 400 may be used in a user interface screen of the printing system 1. On the user interface screen each media print mode in the two dimensional media print mode table is uniquely determined by a uniquely determined combination of a print speed value and an ink coverage value. Each media print mode comprises an indication item of the test result corresponding to the uniquely determined combination, e.g. the two-dimensional media print mode table contains in each cell an indication of the test result. The test result may be good, bad or conditional. If the test result is bad, the cell may be provided with a cross symbol 410. If the test result is conditional, the cell may be provided with an exclamation mark 420. If the test result is good, the cell may be empty or green coloured for example.

A media print mode may be selected from the two-dimensional table on the local user interface 7 of the printing system 1 in order to be applied when printing on the corresponding print medium. When no media print mode is selected by the user the default media print mode for the print medium may be automatically applied for printing on the print medium.

In order to help the user to select a media print mode for the print medium, on the user interface screen a cell of the two-dimensional media print mode table may also contain an indication of the default media print mode ("DEFAULT"), a High Speed media print mode ("High Speed") and a High Gamut media print mode ("High Gamut") to be used for printing on the print medium. When clicking on the cell the corresponding media print mode is going to be used with the corresponding print speed and corresponding ink coverage when printing on the print medium.

In order to further help the user to select a media print mode for the print medium, on the user interface screen a cell of the two-dimensional media print mode table may also contain an indication of a warning to use or not use the print medium, for example an exclamation mark ("!"). When activating—by clicking, touching, moving over, etc.—the warning indication conditions how and when to use or to not use the print medium with the corresponding print speed and corresponding ink coverage may be displayed for example by means of a pop-up window.

Figure 6:
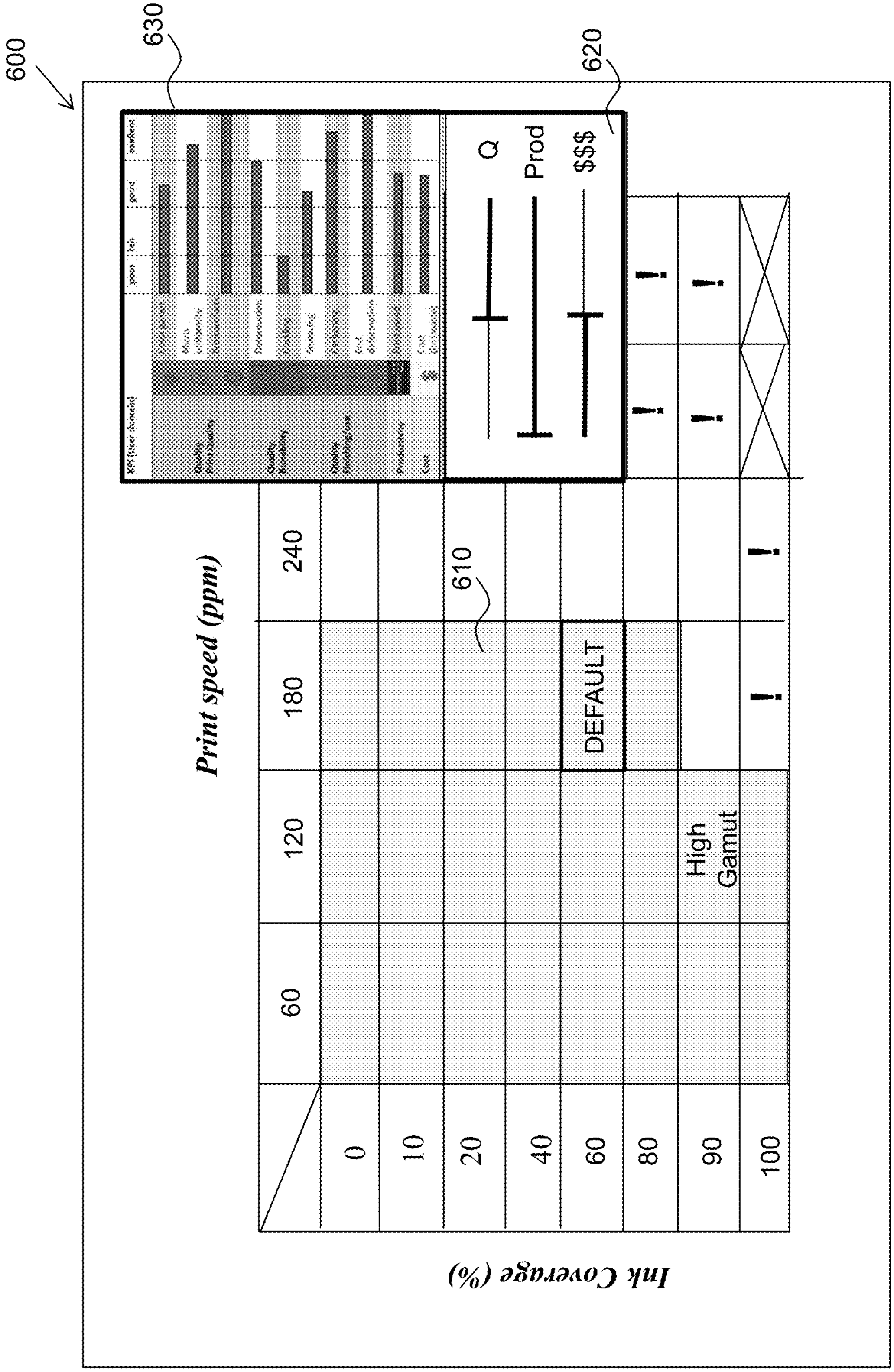
FIG. 6 shows a user interface window provided with the two-dimensional media print mode table of FIG. 3 with indications of the test results and a slider window to filter the media print modes according to slider positions for the key performance indicators according to the invention.

FIG. 6 shows a further embodiment of the present invention. In order to further help the user to select a media print mode for the print medium, a user operable element 620 comprising sliders may be provided on the user interface screen 600. The user operable element 620 provides a slider for each high level key performance indicator (Quality labelled "Q", Productivity labelled "Prod" and Cost labelled "$$$") from the shown key performance indicator table 630. Each slider has a corresponding range of values for the related key performance indicator. By setting the sliders on certain positions in the range, the cells 610 which have values of the key performance indicators satisfying the settings by the sliders may be coloured green in the two-dimensional media print mode table. In other words, the cells that fit within the selected ranges by the sliders are coloured green. The cells that do not fit within the selected ranges by the sliders are not coloured green. By setting the sliders according to the user's wishes, the applicable cells, i.e. media print modes for the print medium, will become visible in the media print mode table shown in FIG. 6.

Besides displaying the user interface screen 600 on the local user interface 7 of the printing system 1, the user interface screen 600 comprising the media print mode table 400 may also be part of tool software installed on an external device like a mobile phone, tablet or computer digitally connected to the network to which the printing system 1 is also connected.

In order to link the information of the media print mode table 400 to the new print medium another user interface screen (not shown) is provided for entering a provisional identification of the new print medium, for example a print medium name. The underlying system settings for each media print mode in the media print mode table 400 may be stored in a so-called media catalogue or media list residing in the print controller 39 of the printing system 1.

The sensors in the paper path of the printing system 1 may check if the print medium may be transported for simplex and duplex through the printing system 1 along the paper path.

The sensors may determine geometrical characteristics of the print medium, for example a size of the print medium, a size and location of pre-punched holes, perforations, tabs, etc.

The sensors may determine whether the print medium may be printed on without pollution of the printing system 1. Pollution may be caused by ink not sticking. This pollution is determined by checking the porosity and/or absorption characteristics of the print medium. Pollution may be caused by melting of the print medium of print medium coatings during fixation of the ink.

The sensors may determine pre-printed content. By doing so, pre-printed print-keep-out regions of the print medium sheets are determined.

The sensors may be temperature sensors, humidity sensors, light sensors, sound based sensors, etc.

The media print modes may be explored according to the media print mode table on a row-by-row basis or on a column-by-column basis. According to a row-by-row basis the print speed is increased stepwise at a same level of ink coverage.

According to a column-by-column basis the ink coverage is increased stepwise at a same level of print speed.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The invention claimed is:

1. A method for profiling a print medium for use in a printing system, the printing system configured to print on profiled print media and comprising:

a print controller for controlling printing system parameters to be applied when printing on the print medium;

a print engine for printing marking material on the print medium;

an input holder for receiving the print medium in the printing system;

an output holder for receiving the print medium when printed by the print engine;

a test job receiver for digitally or analogue receiving a plurality of test jobs submitted to the printing system;

a paper path comprising a duplex loop for sending the print medium twice along the print engine; and sensors along the paper path, the method comprising the steps of:

a) receiving the print medium in the input holder;

b) digitally receiving the plurality of test jobs in the test job receiver, wherein for each test job of the plurality a uniquely determined combination of at least a first printing system parameter of print speed of the printing system and a second printing system parameter of coverage of the marking material is intended to be prepared by the print controller;

c) for each test job:

c1) processing the test job according to the uniquely determined combination using the print medium to be profiled; and c2) the printing system registering a test result of the test job wherein the test result is derived from sensor values registered by the sensors in the paper path of the printing system and measured during the processing of the test job; and d) the print controller creating a two-dimensional media print mode table of media print modes for the print medium to be profiled based on the registered test results of the plurality of test jobs for the print medium, the two-dimensional media print mode table to be selected from when printing on the print medium, wherein each media print mode is uniquely determined by a uniquely determined combination from step b) and comprises an indication item of the test result corresponding to the uniquely determined combination.

2. The method according to claim 1, wherein the method comprises the step of limiting the two-dimensional media print mode table to media print modes which have good or conditional test results.

3. The method according to claim 1, wherein each test job of the plurality of test jobs is further determined by at least one of a first specification criterion whether or not the test job comprises an image to be printed, a second specification criterion whether or not the test job makes use of the duplex loop, a third specification criterion which at least one kind of marking material is used, and a fourth specification criterion of a print head height in case of the print engine comprising a print head.

4. The method according to claim 3, wherein the at least one kind of marking material is a coloured ink, a varnish ink, a primer ink and/or a coloured toner.

5. The method according to claim 1, wherein the method comprises the step of selecting from the two-dimensional media print mode table based on the test results at least one of a default media print mode, a high gamut media print mode, and a high speed media print mode.

6. The method according to claim 5, wherein the method comprises the step of determining from the test results at least one key performance indicator value with respect to each of an image quality, printer productivity and/or print cost, and automatically selecting at least one out of the default media print mode, the high gamut media print mode and the high speed media print mode based on the at least one key performance indicator value.

7. The method according to claim 1, wherein for each test job the step of registering the test result of the test job comprises the sub-steps of:

sensing, during processing of the test job, the print medium being transported from the input holder by means of the paper path to the output holder along the print engine and a plurality of sensors resulting in a plurality of measured sensor values; and determining the test result of the test job based on the measured sensor values to be good, bad or conditional.

8. The method according to claim 1, wherein at least one test job is a digital image and the test job receiver is digital.

9. The method according to claim 1, wherein at least one test job is a hardcopy original and the test job receiver is analogue.

10. Printing A printing system configured to profile print media and comprising a print controller for controlling printing system parameters to be applied when printing on the print medium, a print engine for printing marking material on the print medium, an input section for receiving the print medium in the printing system, a paper path from input holder to output holder comprising a duplex loop, an output section for receiving the print medium when printed, a receiving section for receiving test jobs submitted to the printing system, and a plurality of sensors along the paper path, wherein the print controller is configured to execute the steps of the method according to claim 1.

11. A non-transitory recording medium comprising computer executable program code configured to instruct a computer to perform the steps of the method according to claim 1.

* * * * *